US007530062B2

(12) United States Patent
Aronson et al.

(10) Patent No.: US 7,530,062 B2
(45) Date of Patent: May 5, 2009

(54) OPTIMIZING COMPILER TRANSFORMS FOR A HIGH LEVEL SHADER LANGUAGE

(75) Inventors: David Floyd Aronson, Woodinville, WA (US); Anuj Bharat Gosalia, Redmond, WA (US); Craig Peeper, Bellevue, WA (US); Daniel Kurt Baker, Seattle, WA (US); Loren McQuade, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 922 days.

(21) Appl. No.: 10/445,397

(22) Filed: May 23, 2003

(65) Prior Publication Data

US 2004/0237074 A1 Nov. 25, 2004

(51) Int. Cl.
*G06F 9/45* (2006.01)
(52) U.S. Cl. ..................... 717/159; 717/154
(58) Field of Classification Search .......... 717/151–161
See application file for complete search history.

(56) References Cited

OTHER PUBLICATIONS

Hoppe, "Optimization of Mesh Locality for Transparent Vertex Caching", ACM, pp. 269-276, 1999.*
Chen, "Effective Instruction Scheduling With Limited Register", Thesis, Harvard University, pp. 1-116, A1-A5, B1-B13, Mar. 2001.*
Engel, "Introduction to Shader Programming Part III—Fundamentals of Pixel Shaders", http://www.gamedev.net/reference/articles/article1820.asp, pp. 1-41, May 2002.*
Kessenich et al., "The OpenGL Shading Language," Copyright © 2002-2003 3Dlabs, Inc., Ltd., pp. 1-100 (Feb. 25, 2003).
Press Release, "Cg Momentum Increasing in the Developer Community," *NVIDIA Corporation*, http://www.nvidia.com, (Jul. 23, 2002), pp. 1-4.
Press Release, "NVIDIA Releases Beta 2 of Cg Compiler and Toolkit," *NVIDIA Corporation*, http://www.nvidia.com, (Aug. 21, 2002), pp. 1-3.
Press Release, "NVIDIA Ushers in a New Era in Graphics with its Advanced Compiler for the Cg Language," *NVIDIA Corporation*, http://www.nvidia.com, (Jun. 13, 2002), pp. 1-3.
Technical Brief, "The NVIDIA Cg Compiler C for Graphics," *NVIDIA Corporation*, Copyright © 2002, pp. 1-12 (Jun. 12, 2002).

* cited by examiner

*Primary Examiner*—Ted T Vo
(74) *Attorney, Agent, or Firm*—Klarquist Sparkman, LLP

(57) ABSTRACT

A high level shader language compiler incorporates transforms to optimize shader code for graphics processing hardware. An instruction reordering transform determines instruction encapsulations of dependent instructions that reduce concurrent register usage by the shader. A phase pulling transform re-organizes the shader's instructions into phases that reduce a measure of depth of texture loads. A register assigning transform assigns registers to lower register usage by the shader.

30 Claims, 7 Drawing Sheets

Figure 3 RECURSIVE EMIT INSTRUCTION PROCEDURE

Shader Compiler with Optimizing Transforms 780

OPTIMIZING COMPILER TRANSFORMS FOR A HIGH LEVEL SHADER LANGUAGE

BACKGROUND OF THE INVENTION

1. Technical Field

The invention relates generally to optimizing code generation by compilers, and more particularly relates to code transforms for improved code generation in compilers for high level shader languages.

2. Description Of Related Art

Computers commonly have a graphics adapter or graphics accelerator that contains a specialized microprocessor, generally known as a graphics co-processor or graphics processing unit (GPU). A GPU also can be integrated into the chip set contained on the motherboard of the computer. The GPU handles high-speed graphics-related processing to free the computer's central processing unit (CPU) for other tasks. Today's graphics adapters (e.g., various graphics adapter models available from NVIDIA and ATI Technologies, among others) feature GPUs that are specifically designed to render 3-dimensional (3D) graphics images and video at high frame rates, such as for use in computer games, video and other graphics intensive applications. Some CPUs for computers also include specialized instructions in their instruction sets that are designed for graphics-related processing (e.g., the MMX instructions in Intel Corporation microprocessors).

In past graphics adapters, the GPU generally provided fixed functionality for graphics processing operations. Application programs (e.g., a game with 3D graphics) would interact with the graphics adapter through a graphics application programming interface (API), such as Microsoft Corporation's DirectX®, and OpenGL® of Silicon Graphics, Inc. Through a graphics API, the application programs directed the GPU to execute its fixed graphics processing functions.

In its version 8, Microsoft DirectX® more recently introduced the concept of a programmable graphics shader for recent programmable graphics hardware. A shader is a program that executes on graphics hardware to perform graphics processing on a per pixel, or per vertex (or other graphics component or fragment) basis for 3D graphics rendering. DirectX® 8 included a language for writing shaders. However, this language was a low-level, assembly-like language and also very specific to certain GPU architectures. This made it more difficult for application developers to take advantage of this improved programmability of the graphics hardware.

DirectX® version 9 introduced a high level programming language for shaders (called the High Level Shading Language or HLSL) to make it easier for application developers to create shaders. The HLSL is syntactically similar to the well known C programming language. This makes it easier for programmers who are familiar with C to understand.

A problem arises, however, in that non- or less than optimal object code may result from compiling a high level language into object code of a target processor. Further, programmable GPUs are vector-based processors with different architectural constraints than conventional CPU processors. Accordingly, known code optimization techniques may still fail to produce more optimal code for shaders on programmable graphics hardware.

For example, a current typical programmable GPU provides a set of vector registers for loading textures from graphics memory. The textures are a set or array of values held in the graphics memory of the graphics adapter. Typically, the registers have capacity for four components of vector values pulled one at a time from an assigned texture in memory. The GPU executes texture load instructions that assign the texture to be loaded in the components of a register, and arithmetic instructions that operate on vectors of the texture. However, direct translation by a compiler of high level shader language instructions would result in shaders that fail to efficiently utilize the register architecture of these processors, and conventionally known compiler code optimizations are not designed to optimize this type of processor architecture.

SUMMARY

A compiler for a high level shader language employs shader code optimizing transforms to produce more optimal code, such as for execution on a programmable GPU or other graphics hardware. This allows efficient shader programs to be produced using a high level shader language that is easier for programmers to write.

Among other optimizing transforms implemented in a high level shader language compiler described herein, the shader code optimizing transforms include an instruction reordering transform, a phase pulling transform and a register assigning transform. The instruction reordering transform determines instruction encapsulations of dependent instructions that reduce concurrent register usage by the shader. The phase pulling transform re-organizes the shader's instructions into pairs of texture load and arithmetic operation phases that reduce a measure of depth of texture loads. The register assigning transform assigns registers to variables in such a way as to lessen the number of registers used by the shader.

Additional features and advantages of the invention will be made apparent from the following detailed description of embodiments that proceeds with reference to the accompanying drawings.

DETAILED DESCRIPTION

The following description is directed to a high level shader language compiler that incorporates shader code optimizing transforms to produce more optimal shaders for programmable graphics hardware. In one implementation, the shader optimizing transforms are incorporated in a compiler for Microsoft Corporation's high level shading language. Alternatively, the shader optimizing transforms can be incorporated into compilers for other high level shader languages, such as Cg ("C" for graphics) of NVIDIA and glslang (The OpenGL Shading Language) of 3Dlabs, Inc. Ltd.

1. General Compilation Process for High Level Shader Language

Figure 1:
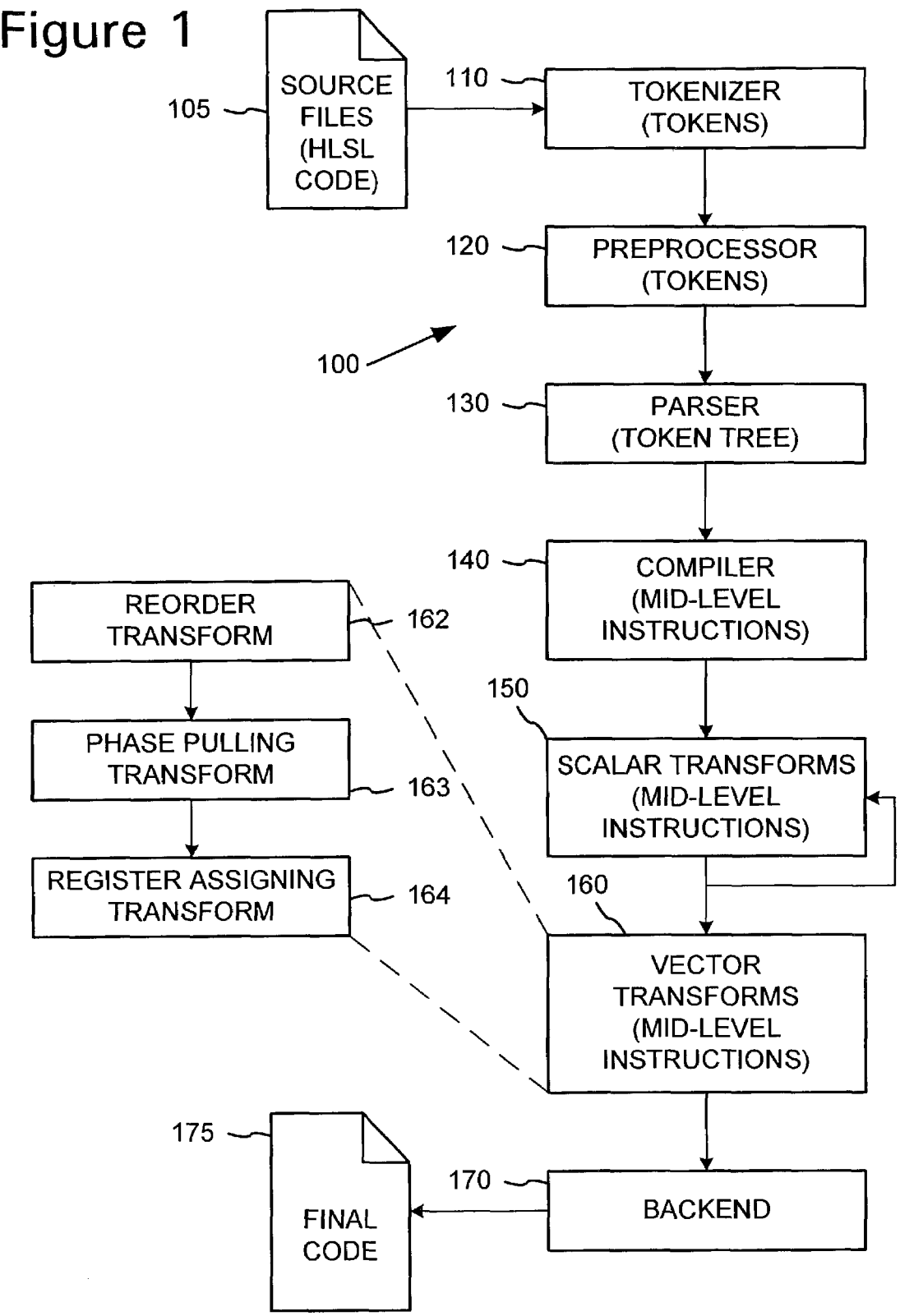
FIG. 1 is a block diagram high level shader language compiler incorporating shader code optimizing transforms described herein.

With reference to FIG. 1, an optimizing high level shader language compiler 100 (hereafter optimizing shader compiler) compiles text source files 105 written in a high level shader language into final code 175 for execution on programmable graphics hardware. The final code can be hardware-specific executable code, or can be an intermediate code form that is generic to multiple programmable graphics hardware platforms.

The optimizing shader compiler 100 utilizes familiar compilation techniques, including lexical analysis, syntax analysis, code generation and code optimization to translate from the high level shader language into target code. In particular, the optimizing shader compiler 100 includes a tokenizer 110, a preprocessor 120, a parser 130, a compiler 140, scalar transforms 150, vector transforms 160 and a back-end 170. The tokenizer 110 first reads the high level shader language text contained in the source file(s) 105, and performs lexical analysis of the text to separate out individual words (called tokens). This translates the high level shader language text into a tokenized version (or token stream) of the shader. The preprocessor 120 further reads this tokenized version of the shader, and performs macro expansions of any macros appearing in the program to build a final tokenized version of the shader.

The parser 130 then performs syntax analysis of the tokenized shader to recognize syntax structures of the high level shader language in the tokenized shader, and organizes the tokens into a tree representing the syntax structure of the shader. This results in a token tree representation of the shader.

The compiler 140 then translates the shader into a sequence of mid-level instructions. The compiler 140 reads the token tree representation of the shader, and generates a set of corresponding mid-level instructions. The mid-level instructions are then operated upon by two sets of transforms that seek to better optimize the shader for more efficient execution on the graphics hardware. First, a set of scalar transforms 150 operate on the mid-level instructions, which treat all arguments of the mid-level instructions as scalars. The scalar transforms include dead code removal, combining or removing duplicate expressions, and simplifying expressions (for example, identifying data types and operations that can be simplified to expose dead code or duplicate expressions that can be removed). These scalar transforms 150 are repeated in multiple passes over the mid-level instruction sequence until no further changes result.

Second, a set of vector transforms 160 that recognize arguments as vectors (when applicable) are applied to the mid-level instruction sequence. These vector transforms can include transforms to vectorize, remove swizzles, combine instructions and vectorize literals. The vectorize transform ensures inputs and outputs of expressions are vectorized, and may also split an expression into sub-expressions. The remove swizzles transform identifies whether a variable is always referenced in the shader with a swizzle, and if so, reorders the variable to remove the swizzle. The combine instructions transform attempts to identify separate instructions that can be combined into a single instructions. For example where there are two 2-way add instructions in the same register, the transform can combine the add instructions into a more efficient single 4-way add instruction. The vectorize literals transform assigns literals to constant registers in a compact way.

In addition, the vector transforms 160 include a set of shader optimizing transforms that better optimize the code to execute as a shader on programmable graphics hardware. The shader optimizing transforms seek to structure the code of the shader to the characteristics of programmable graphics hardware, for example, to better utilize the vector registers that are characteristic of GPUs. These shader optimizing transforms include a reorder transform 162, a phase pulling transform 163 and a register assigning transform 164, which are discussed more fully below.

Finally, the back-end 170 compiles the mid-level instructions to produce final code of the shader, such as in assembly code or machine code that is executable on the target graphics hardware platform.

2. Reorder Instructions Transform

Figure 2:
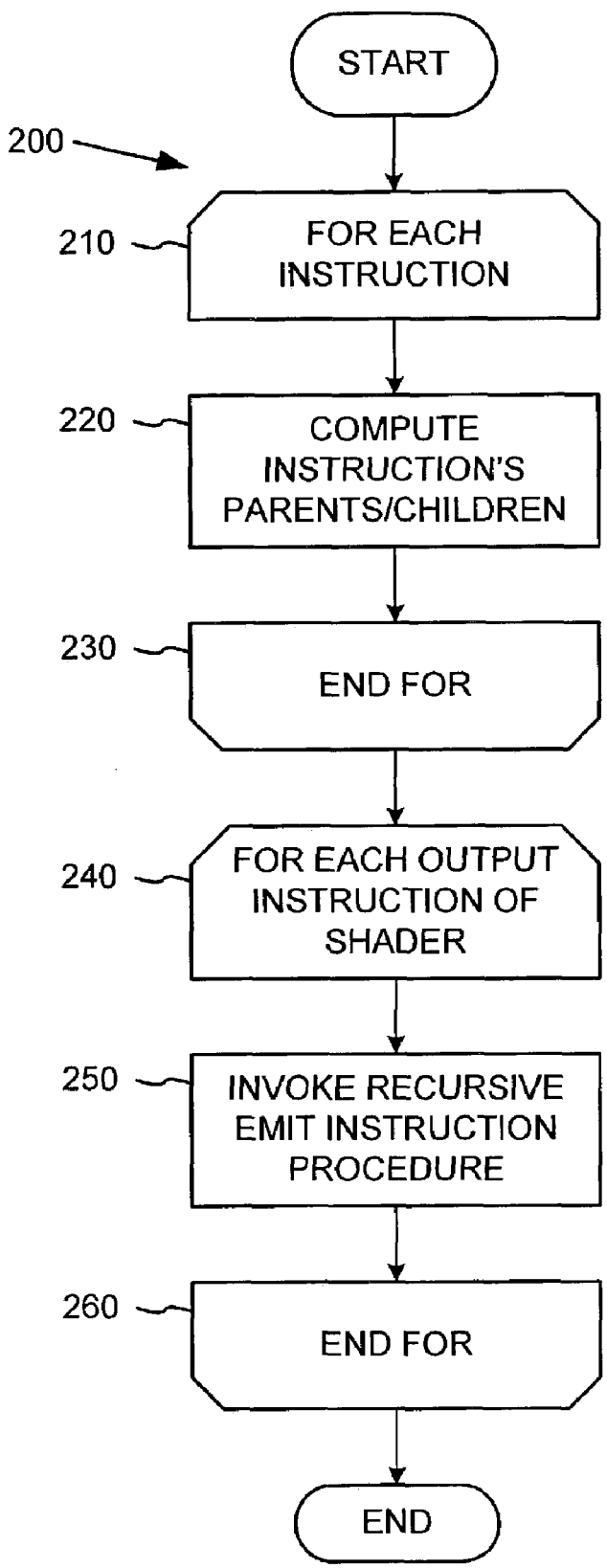
FIG. 2 is a flow diagram of a process for an instruction reordering transform in the compiler of FIG. 1.
Figure 3:
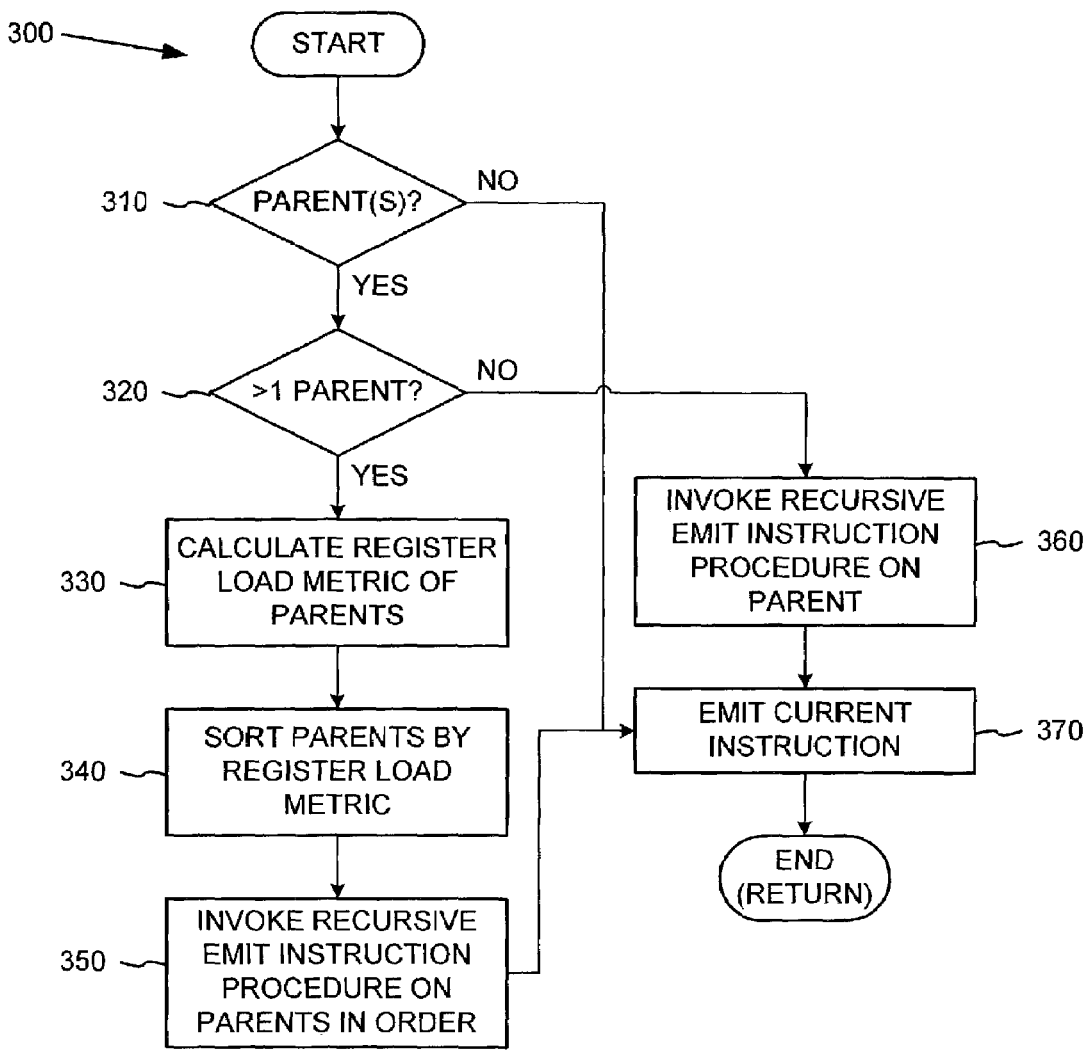
FIG. 3 is a flow diagram of a recursive emit instruction procedure used in the instruction reordering transform of FIG. 2.

With reference now to FIGS. 2 and 3, the reorder instruction transform 162 (FIG. 1) modifies the order in which instructions occur in the shader to make better use of the limited number of vector registers in programmable graphics hardware. In particular, the reorder instruction transform seeks to move instructions ahead when possible that reduce the number of registers in active use by the shader. In effect, the transform thereby minimizes the active register count of the shader (i.e., the shader can execute with fewer registers available). Where the graphics hardware provides multiple shader execution units all utilizing a set of registers, this may permit more instances of the shader to execute concurrently on the graphics hardware, or permit concurrent execution with other shaders on other execution units of the GPU.

The reorder instruction transform in the illustrated compiler 100 (FIG. 1) is implemented as a process 200 (FIG. 2) and recursive procedure 300 (FIG. 3). The reorder instruction transform 162 begins by, for each instruction in the shader (actions 210, 230), computing (action 210) a list of the instruction's parent instructions and a list of its child instructions. Parent instructions are those instructions that produce values consumed by the current instruction. Child instructions are those instructions that consume values produced by the current instruction.

The reorder instruction transform 162 then works backward from each output instruction of the shader (actions 240, 260), invoking (action 250) the recursive procedure 300 to emit all of the instruction's parents before the instruction itself is emitted. If the instruction has more than one parent, the recursive procedure 300 sorts between the parent instructions and first emits those parent instructions that lessen the register load. This has the effect of moving forward in the shader's execution sequence those instructions that lessen the register load as possible, so that the shader's overall active register count is reduced.

More particularly, the recursive emit instruction procedure 300 first determines (actions 320, 320) whether the current instruction has no parents, has one parent, or has multiple parents. In the case where the instruction has multiple parents, the recursive emit instruction procedure 300 employs a heuristic to decide a sort order in which to emit the parent instructions. In one implementation, the heuristic involves calculating (action 330) a register load metric of each of the instruction's parents to measure which instruction may better reduce the active register load. The metric generally represents the number of registers that the instruction requires to be active from above the instruction versus the number of registers required to be active following the instruction, or in other words the effect the instruction has on the shader's register load. The metric takes into consideration various characteristics of the parent instruction, i.e., how many values emitting the parent will consume (which lessens the register load), how many values emitting the parent will produce (increases the register load), and how many instructions it will take to emit the parent.

More particularly, the procedure 300 calculates the register load metric of each parent of the current instruction by identifying a sub-graph of the instructions in the shader, which sub-graph contains the respective parent instruction and all the parent's ancestors which have not yet been emitted (conceptually, "coloring" a sub-graph containing the parent and its ancestors). The procedure 300 then counts the number of reads made from inside this sub-graph to outside ("NumReadsFromInside"), and vice versa (NumReadsFromOutside). The metric is then calculated as the difference between these numbers, divided by the number of instructions in the sub-graph, as follows:

$$M_{RL} = \frac{(R_I - R_O)}{I}$$

Where $M_{RL}$ is the register load metric, $R_I$ is the NumReadsFromInside, $R_O$ is the NumReadsFromOutside, and I is the number of instructions.

At action 340, the recursive emit instruction procedure 300 then sorts the parent instructions in order of which of the parent instructions better reduces the register load according to the calculated metric. At action 350, the recursive emit instruction procedure 300 is invoked for the parent instructions according to this sort order, so that the sub-tree of the parent instruction that better reduces the register load is emitted first. After returning from the recursive emit instruction procedure invocations on the parent instructions, the current instruction is emitted at action 370.

In the case that the current instruction has but a single parent (actions 310, 320), the recursive emit instruction procedure 300 is invoked for the single parent instruction at action 360. After which, the current instruction is emitted at action 370.

In the case that the instruction for the current invocation of the recursive emit instruction procedure 300 has no parents, the current instruction is simply emitted at action 370.

3. Phase Pulling Transform

Figure 4:
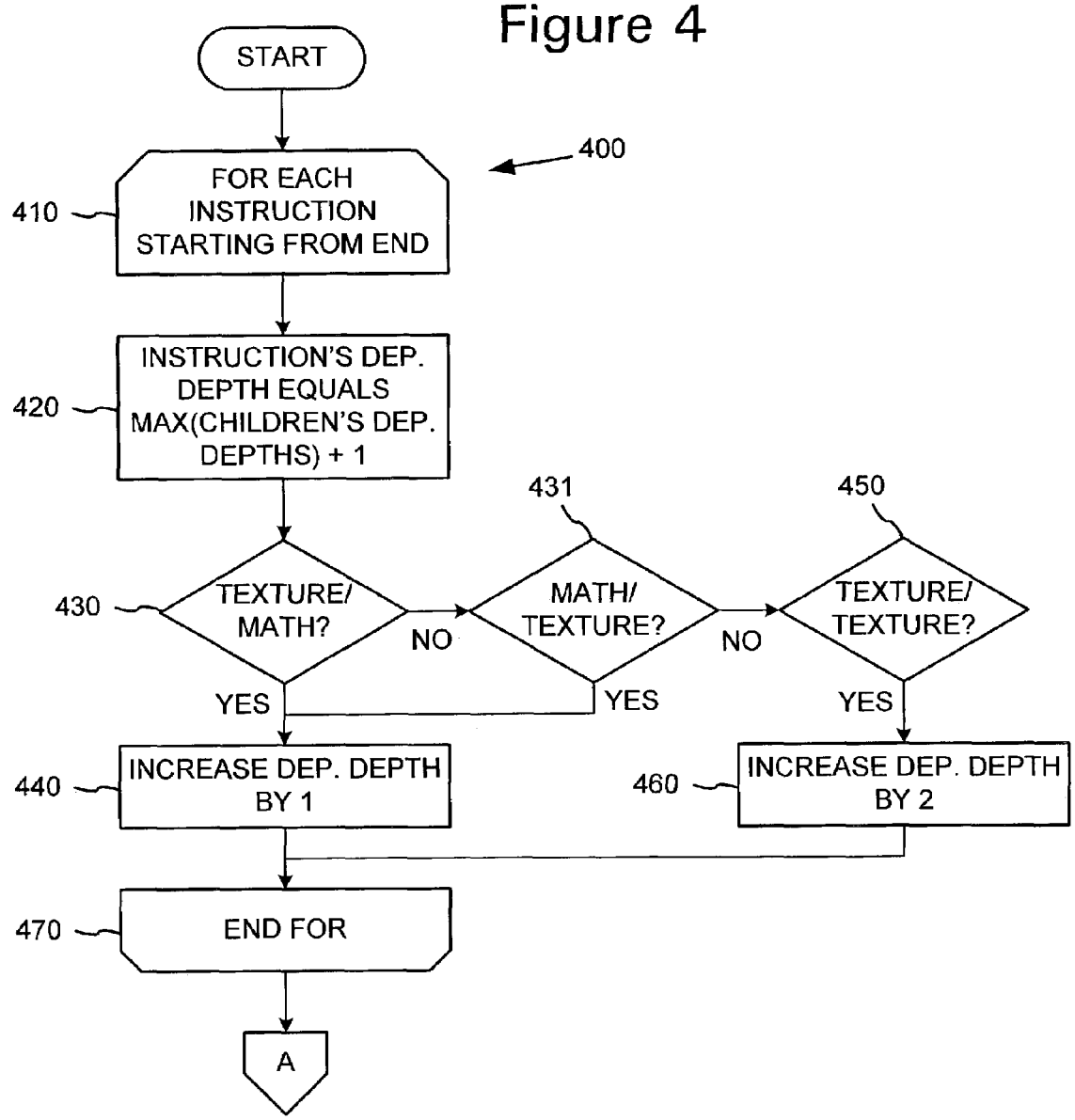
FIGS. 4 and 5 are a flow diagram of a process for a phase pulling transform in the compiler of FIG. 1.
Figure 5:
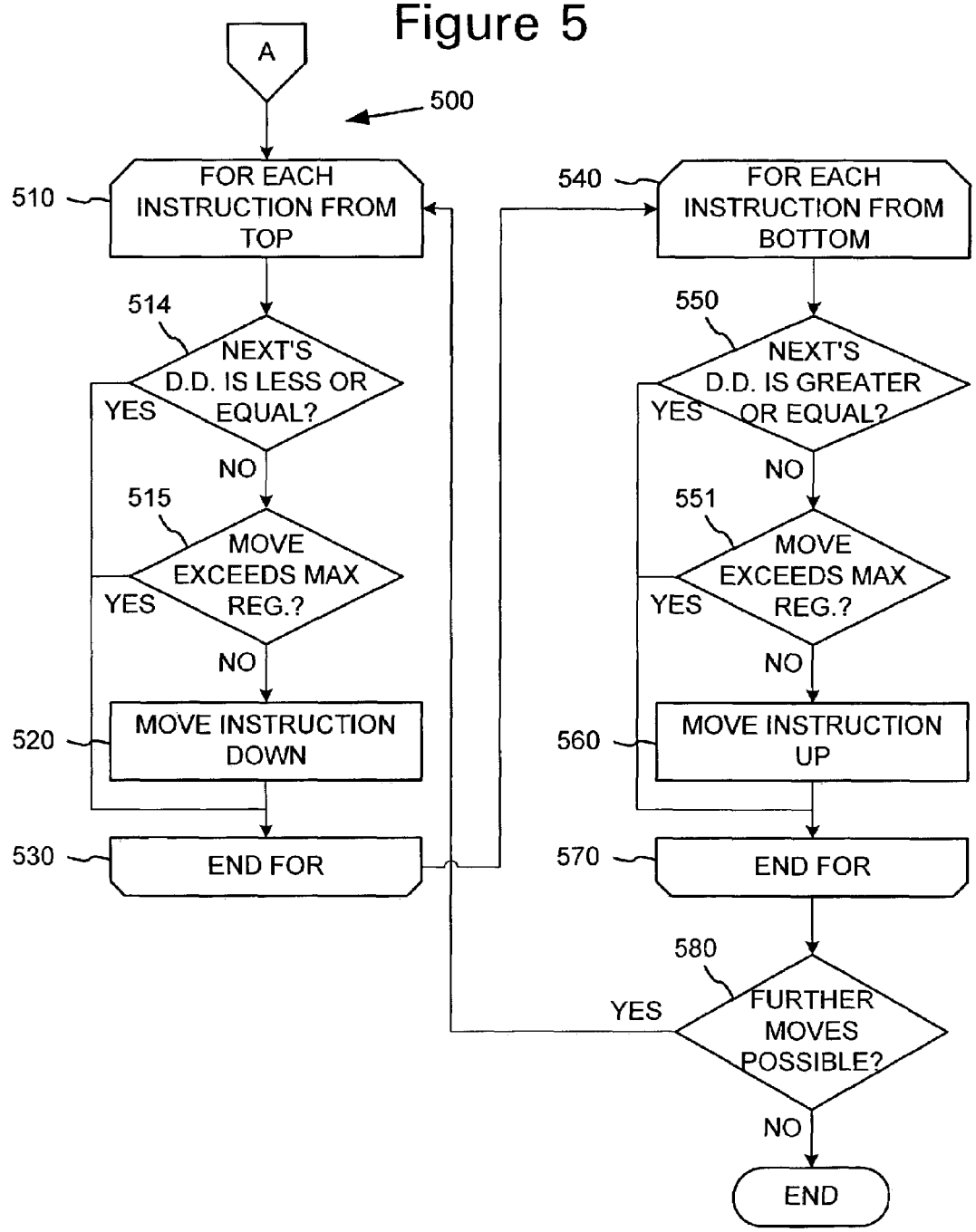

With reference to FIGS. 4 and 5, the phase pulling transform 163 (FIG. 1) is an attempt to organize the shader into "phases," which consist of sets of non-interdependent texture load instructions alternating with sets of arithmetic instructions on the loaded textures. The texture load instructions in any one phase are not dependent on each other. This organization of the shader's instructions into phases helps satisfy dependent texture read limitations. The phase pulling transform has the effect of packing the shader's instructions into a more minimal number of phases or blocks.

In a first part 400, the phase pulling transform 163 first calculates the "dependent depth" of every instruction in the shader. As indicated in actions 410, 470, the phase pulling transform begins from the end of the shader program, and works backward. Each parent instruction is assigned (action 420) a dependent depth that is at least one higher than any of its children (i.e., a maximum of the dependent depths of the instruction's children plus one). Further, if the parent is a texture load instruction while the child (with the maximum dependent depth of the children) is an arithmetic instruction (or vice versa) at actions 430, 431, the parent's dependent depth is increased by an additional increment at action 440. If both parent and this maximum dependent depth child are texture load instructions (action 450), then the parent's dependent depth is increased by two at action 460 (so as to reflect an "empty" phase with no arithmetic instructions).

In a second part 500, the phase pulling transform 163 performs a series of passes over the shader, alternating moving lower dependent depth instructions toward the end of the shader and moving higher dependent depth instructions toward the beginning of the shader, subject to certain constraints. This effect is analogous to a centrifuge in that lower dependent depth instructions fall, while higher dependent depth instructions rise in the shader.

In particular, the phase pulling transform in actions 510-530 moves instructions with lower dependent depth downward in the shader. This downward moving pass begins at the top of the shader (action 510). The phase pulling transform examines the instructions in turn. If the dependent depth of the current instruction is less than or equal to that of the next instruction (action 514) and moving the current instruction down would not cause the number of registers used by the shader to exceed a maximum (action 515), then the instruction is moved down past the next instruction.

Then, in an upward moving pass in actions 540-570, the phase pulling transform moves instructions with higher dependent depth upward in the shader. The phase pulling transform examines the instructions in order from the bottom of the shader (action 540). If both the current instruction's dependent depth is greater or equal to the next instruction (action 550) and an upward move would not cause the shader to exceed the maximum number of registers in use (action 551), then the phase pulling transform moves the current instruction up past the next instruction at action 560.

The phase pulling transform continues to alternate the upward moving pass (actions 510-530) and downward moving pass (actions 540-570) until no further moves are possible (action 580).

4. Register Assignment Transform

Figure 6:
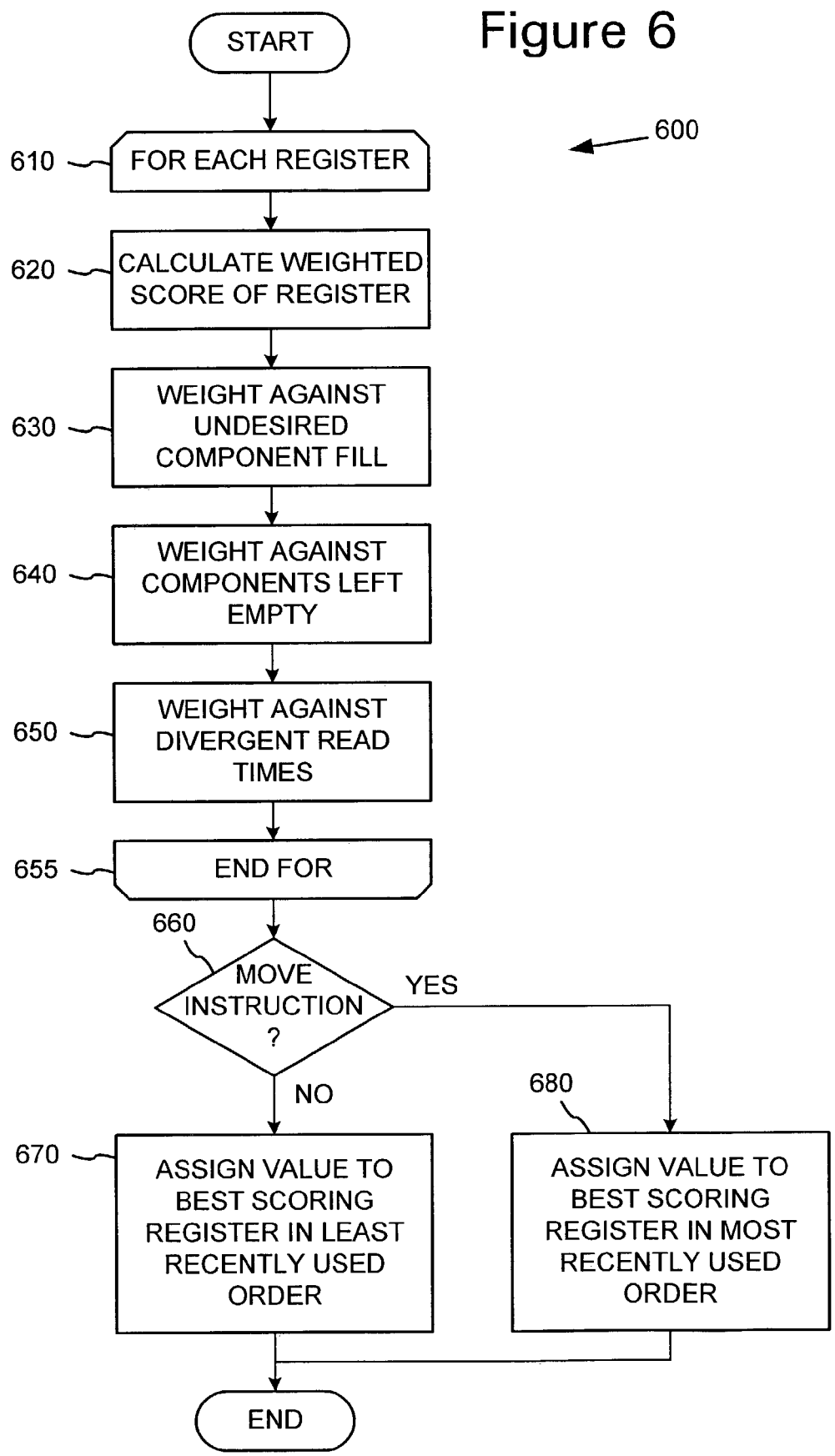
FIG. 6 is a flow diagram of a process for a register assigning transform in the compiler of FIG. 1.

With reference now to FIG. 6, the register assigning transform 164 attempts to solve a problem of packing instruction operands into a finite number of graphics processor registers. As summarized above, current programmable GPUs typically provide a finite number of multi-component vector registers that can be assigned by texture load instructions to pull vector values from a texture in graphics memory. For example, a GPU may have registers that hold 4-component values, labeled x, y, z and w. On the other hand, the instruction operands may be arrays of scalars or vectors having 1, 2, 3 or 4 component values. Further, certain sizes of operands (in component number) have preferred placements in the registers. In some programmable GPUs, the GPU is structured so that arithmetic instructions on scalar (single-value) operands operate more efficiently when the value is stored as the w-component of a register, whereas arithmetic on 3-component vector operands are more efficiently executed with the values stored in the x, y and z components of the register. However, assigning a register to store a scalar value prevents its use for storing a 4-component vector operand, and leaves 3 components of the register unused. Further, the values have different lifetimes (durations of occupation of the register), depending on when they are first written and last read in the shader.

The register assigning transform 164 achieves a more efficient utilization of the registers by weighing assigning operands among available registers according to a set of factors. The factors include the preferred component location for the size of the operand, avoiding partially full registers, and how closely in time the lifetimes of all operands in the register will expire (having operands become free as closely in time as possible tends toward maximizing the number of free registers).

More particularly, the register assigning transform 164 executes process 600 when assigning the register location for an instruction operand. In process 600, the register assigning transform 164 first calculates a weighted score for each available register assignment for the operand in actions 610-655. In calculating this weighted score, the register assigning transform 164 weights (action 630) the score against register assignments where the operand would be in other than a preferred component location according to the operand's component size (e.g., the w-component for scalar operands, or x, y and z components for 3-component vector operands). Additionally, the register assigning transform 164 weights (action 640) against register assignments that would leave components of the assigned register unused. Further, the register assigning transform weights against register assignments where operands in a register have divergent ends of lifetime, i.e., the component locations of the register become free at divergent times.

In one implementation, the weighted score is computed using the following expression: (SumOfComponentDistancesFromDesired<<24)|(NumberOfComponentsLeftOver<<16)|(SumOfDistancesBetweenReadMax), where "<<" is a left shift operator and "|" is a bit-wise OR operator as per C-programming language notation. The value, "SumOfComponentDistancesFromDesired," is the distance from the preferred component location for the operand. For example, assigning a scalar operand to the z-component location of a register is one distant from the preferred assignment of scalars to the w-component location, whereas assignment to an x-component location of a register would be three distant from the operand's preferred component location. The value, "NumberOfComponentsLeftOver," is the number of components left unused by the assignment. For example, assigning a scalar component to the w-component location of an empty register would leave three components unoccupied. However, assigning a scalar component to a register already having a 2-component operand occupying its x- and y-component locations would leave only one component location unoccupied. The value, "SumOfDistancesBetweenReadMax," is the distance between read instructions that read operands from the register (thus freeing the component locations occupied by the operands). For example, assigning a 2-component operand to a register already occupied by another 2-component operand, where the read instructions that consume the operands are 21 instructions apart in the shader, would have a maximum distance between reads of 21. In this implementation of the weighted score calculation, the register assignment having the lower score is the winning register assignment.

The register assigning transform 164 further considers whether the instruction whose operand is being assigned is a move (MOV) instruction. For most instructions (non-move instructions), the register assigning transform 164 assigns the registers in least-recently used order (action 670). The register assigning transform 164 assigns operands of move instructions in most-recently used order (action 680). This is because a move instruction between the same source and destination register locations would be a no-operation instruction that can be omitted from the shader.

5. Computing Environment

The above described software development tool 100 (FIG. 1) and macro processing and display techniques can be implemented on any of a variety of computing devices and environments, including computers of various form factors (personal, workstation, server, handheld, laptop, tablet, or other mobile), distributed computing networks, and Web services, as a few general examples. The high level shader language compiler 100 (FIG. 1) incorporating the above-described shader optimizing transforms can be implemented in hardware circuitry, as well as in compiler software 780 executing within a computer or other computing environment, such as shown in FIG. 7.

Figure 7:
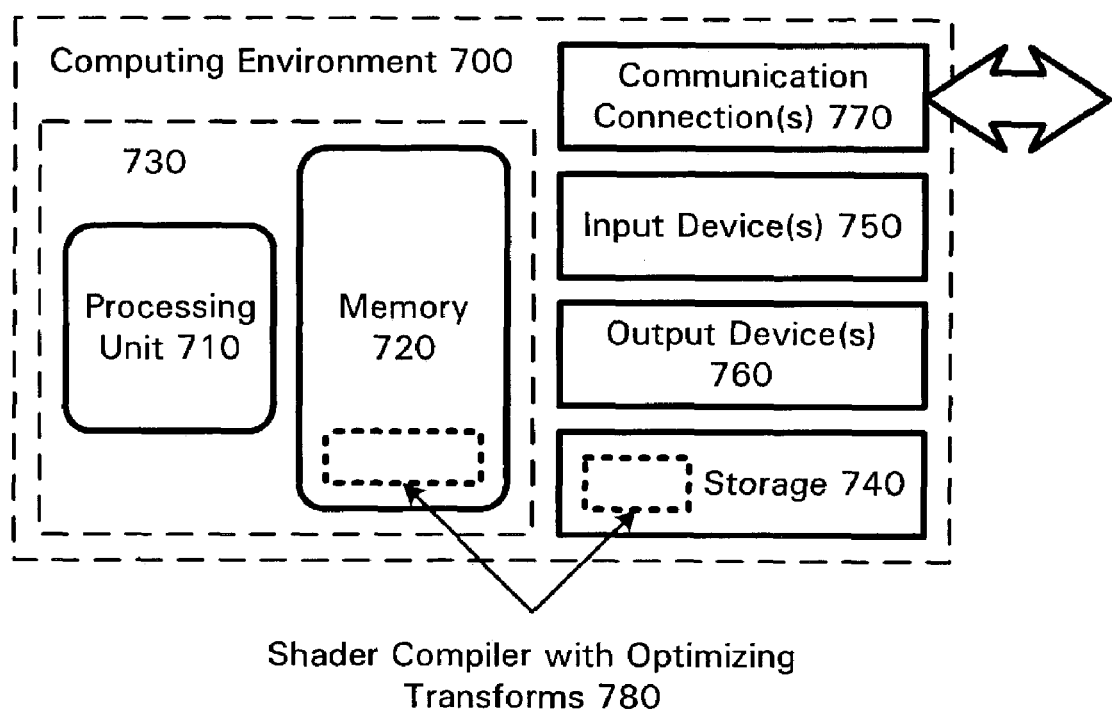
FIG. 7 is a block diagram of a suitable computing environment for implementing the high level shader language compiler of FIG. 1.

FIG. 7 illustrates a generalized example of a suitable computing environment 700 in which the described techniques can be implemented. The computing environment 700 is not intended to suggest any limitation as to scope of use or functionality of the invention, as the present invention may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing the high level shader language compiler 100 with shader optimizing transforms.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. The storage 740 stores instructions for the device connectivity and networking software 780.

The input device(s) 750 (e.g., for devices operating as a control point in the device connectivity architecture 100) may be a touch input device such as a keyboard, mouse, pen, or trackball, a voice input device, a scanning device, or another device that provides input to the computing environment 700. For audio, the input device(s) 750 may be a sound card or similar device that accepts audio input in analog or digital form, or a CD-ROM reader that provides audio samples to the computing environment. The output device(s) 760 may be a display, printer, speaker, CD-writer, or another device that provides output from the computing environment 700. The output devices 760 can include a graphics adapter with a programmable GPU on which the shader is to execute, or alternatively the processing unit 710 may include graphics instructions for executing shaders. However, the computing environment 700 need not include the graphics processor on which the shader is to execute, and instead may simply compile the shader for execution on graphics processors of other computers or computing environments.

The communication connection(s) 770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The high level shader language compiler herein can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. In a computer, a method of optimizing shader code compiled from a high level shader language, the method comprising:

for at least a subset of instructions of the shader, calculating a metric indicative of whether an instruction reduces a count of active vector registers utilized by the shader; and re-ordering the instructions by moving ahead instructions whose calculated metric indicates would reduce the active vector register count of the shader subject to the instructions' interdependencies;

whereby the vector register load of the shader is lessened; and wherein calculating the metric indicative of whether an instruction reduces a count of active vector registers comprises:

identifying a subgraph of instructions in the shader encompassing the instruction and any ancestor instructions on which the instruction depends;

determining a number of reads made from within the subgraph;

determining a number of values produced within the subgraph and read from outside the subgraph;

determining a number of instructions in the subgraph; and calculating the metric as a function of the number of reads from within the sub graph, the number of reads from outside the sub graph and number of instructions in the subgraph.

2. The method of claim 1, wherein calculating the metric indicative of whether the instruction reduces a count of active vector registers further comprises:

calculating a function of a set of values representing a number of vector register values that a subgraph of instructions in the shader encompassing the instruction and any ancestor instructions on which the instruction depends would consume, a number of register values that the subgraph would produce, and a number of instructions in the subgraph.

3. The method of claim 1, wherein calculating the metric indicative of whether the instruction reduces a count of active vector registers further comprises calculating the metric as a ratio of a difference between the number of reads from within the subgraph and the number of reads from outside the subgraph to the number of instruction in the subgraph.

4. The method of claim 1, further comprising:

recursively invoking a procedure to emit a current instruction beginning with an output instruction of the shader, wherein execution of the procedure comprises:

calculating a vector register load metric for any of the current instruction's parent instructions;

sorting the parent instructions in order of better reducing the shader's vector register load according to their calculated vector register load metric;

invoking the procedure to emit the parent instructions in the sorted order; and emitting the current instruction.

5. A computer-readable, program-carrying storage medium carrying a high level shader language compiler thereon, the compiler producing code according to the method of claim 1.

6. In a computer, a method of optimizing shader code compiled from a high level shader language, the method comprising:

for at least a subset of instructions of the shader, calculating a dependent depth of the respective instruction; comprising:

a) identifying any children instructions of the instruction;

b) calculating the dependent depth of the instruction as a maximum of the dependent depths of the instructions' children instructions plus an increment;

in a case where the instruction and its maximum depth child instruction are a texture load instruction and arithmetic load instruction, or vice versa, further increasing the dependent depth of the instruction by an increment; and in a case where the instruction and its maximum depth child instruction are both texture load instructions, then increasing the dependent depth of the instruction by two increments; and rearranging the instructions' sequence based upon their respective dependent depth;

whereby the shader is organized into texture load/arithmetic instruction phases.

7. The method of claim 6, further comprising:

in alternating passes over the instructions, alternately moving down instructions whose dependent depth is less than a next lower instruction and moving up instructions whose dependent depth is higher than a next higher instruction in an instruction sequence of the shader, subject to a constraint that a move not cause the shader to exceed a maximum register load.

8. The method of claim 7, further comprising repeating the alternating passes until no further moves are possible.

9. A computer-readable, program-carrying storage medium carrying a high-level shader language compiler thereon, the compiler producing code according to the method of claim 6.

10. In a computer, a method of optimizing shader code compiled from a high level shader language, the method comprising:
- determining a register for assignment to an instruction operand according to a set of criteria favoring assignments having a preferred placement for the operand's component size, disfavoring assignments leaving a register partially filled, and disfavoring assignments with other operands having divergent read times from the register; and
- assigning the operand to the determined register in the shader code;
- whereby instruction operands are assigned registers tending to minimize the shader's register load; and
  - wherein determining a register for assignment comprises:
  - calculating a weighted score for each of a set of registers having available component locations sufficient to contain the operand:
  - weighting the score against assignment to registers having available component locations other than the preferred placement for the operand's component size;
  - weighting the score against assignment to registers that would leave unfilled component locations; and
  - weighting the score against assignment to registers with other operands having divergent read times from the register.

11. The method of claim 10, further comprising:
- in the case of a move instruction, determining the register for assignment in most recently used order; and
- otherwise, determining the register for assignment in least recently used order.

12. A computer-readable, program-carrying storage medium carrying a shader language compiler thereon, the compiler producing-code according to the method of claim 10.

13. A computer-readable program-carrying storage medium carrying a high level shader language compiler thereon, the compiler comprising:
- a tokenizer for lexically analyzing source text of a shader written in a high level shader language to produce a token representation of the shader;
- a parser for syntactically analyzing the token representation of the shader to produce a token tree representation of the shader;
- a compiler for generating an intermediate code representation of the shader; and
- a set of code optimizing transforms for modifying the intermediate code representation of the shader, the code optimizing transforms comprising at least one of a reorder transform, a phase pulling transform and a register assigning transform;
- the reorder transform operating to reorder instructions of the shader according to a heuristic measure prioritizing subsets of instructions that reduce active register load of the shader in an instruction sequence of the shader;
- the phase pulling transform operating to organize the shader's instructions into phases of texture load instructions and arithmetic instructions that tend to minimize the number of such phases;
- the register assigning transform operating to assign registers for instruction operands that tend to minimize register load of the shader.

14. The computer-readable, program-carrying storage medium of claim 13, wherein the set of code optimizing transforms includes at least two of the reorder transform, the phase pulling transform and the register assigning transform.

15. The computer-readable, program-carrying storage medium of claim 13, wherein the set of code optimizing transforms have an order of execution in which the reorder transform executes before the phase pulling transform.

16. The computer-readable, program-carrying storage medium of claim 13, wherein the set of code optimizing transforms have an order of execution in which the register assigning transform executes after the reorder transform and the phase pulling transform.

17. The computer-readable, program-carrying storage medium of claim 16, wherein the reorder transform comprises:
- code operative to calculate, for at least a subset of instructions of the shader, a metric indicative of whether an instruction reduces a count of active registers utilized by the shader; and
- code operative to re-order the instructions by moving ahead instructions whose calculated metric indicates would reduce the active register count of the shader subject to the instructions' interdependencies.

18. The computer-readable, program-carrying storage medium of claim 17, wherein the code to calculate the metric for an instruction comprises:
- code operative to calculate a function of a set of values representing a number of register values that a subgraph of instructions in the shader encompassing the instruction and any ancestor instructions on which the instruction depends would consume, a number of register values that the subgraph would produce, and a number of instructions in the subgraph.

19. The computer-readable, program-carrying storage medium of claim 17, wherein the code to calculate the metric for an instruction comprises:
- code operative to identify a subgraph of instructions in the shader encompassing the instruction and any ancestor instructions on which the instruction depends;
- code operative to determine a number of reads made from within the subgraph;
- code operative to determine a number of values produced within the subgraph and read from outside the subgraph;
- code operative to determine a number of instructions in the subgraph;
- code operative to calculate the metric as a function of the number or reads from within the subgraph, the number of reads from outside the subgraph and number of instructions in the subgraph.

20. The computer-readable, program-carrying storage medium of claim 19, wherein the code to calculate the metric for the instruction further comprises code operative to calculate the metric as a ratio of a difference between the number of reads from within the subgraph and the number of reads from outside the subgraph to the number of instruction in the subgraph.

21. The computer-readable, program-carrying storage medium of claim 17, further comprising:
- code operative to recursively invoke a procedure to emit a current instruction beginning with an output instruction of the shader;
- the procedure comprising:
  - code operative to calculate a register load metric for any of the current instruction's parent instructions;
  - code operative to sort the parent instructions in order of better reducing the shader's register load according to their calculated register load metric;
  - code operative to invoke the procedure to emit the parent instructions in the sorted order; and
  - code operative to emit the current instruction.

22. The computer-readable, program-carrying storage medium of claim 13, wherein the phase pulling transform comprises:
- code operative to calculate, for at least a subset of instructions of the shader, a dependent depth of the respective instruction; and
- code operative to rearrange the instructions' sequence based upon their respective dependent depth;
- whereby the shader is organized into texture load/arithmetic instruction phases.

23. The computer-readable, program-carrying storage medium of claim 22, wherein the code to calculate the dependent depth of an instruction comprises:
- code operative to identify any children instructions of the instruction;
- code operative to calculate the dependent depth of the instruction as a maximum of the dependent depths of the instructions' children instructions plus an increment;
- code operative to further increase the dependent depth of the instruction by an increment, in a case where the instruction and its maximum depth child instruction are a texture load instruction and arithmetic load instruction, or vice versa; and
- code operative to increase the dependent depth of the instruction by two increments, in a case where the instruction and its maximum depth child instruction are both texture load instructions.

24. The computer-readable, program-carrying storage medium of claim 22, further comprising:
- code operative, in alternating passes over the instructions, to alternately move down instructions whose dependent depth is less than a next lower instruction and move up instructions whose dependent depth is higher than a next higher instruction in an instruction sequence of the shader, subject to a constraint that a move not cause the shader to exceed a maximum register load.

25. The computer-readable, program-carrying storage medium of claim 22, repeating the alternating passes until no further moves are possible.

26. The computer-readable, program-carrying storage medium of claim 13, wherein the register assigning transform comprises:
- code to determine a register for assignment to an instruction operand according to a set of criteria favoring assignments having a preferred placement for the operand's component size, disfavoring assignments leaving a register partially filled, and disfavoring assignments with other operands having divergent read times from the register; and
- code to assign the operand to the determined register in the shader code;
- whereby instruction operands are assigned registers tending to minimize the shader's register load.

27. The computer-readable, program-carrying storage medium of claim 26, wherein the code to determine a register for assignment comprises:
- code operative to calculate a weighted score for each of a set of registers having available component locations sufficient to contain the operand;
- code operative to weight the score against assignment to registers having available component locations other than the preferred placement for the operand's component size;
- code operative to weight the score against assignment to registers that would leave unfilled component locations; and
- code operative to weight the score against assignment to registers with other operands having divergent read times from the register.

28. The computer-readable, program-carrying storage medium of claim 26, further comprising:
- code operative, in the case of a move instruction, to determine the register for assignment in most recently used order, and otherwise, to determine the register for assignment in least recently used order.

29. The computer-readable, program-carrying storage medium of claim 13, wherein the recursive procedure that calculates the register load metric of each parent of a given instruction comprises identifying a subgraph of the parent instruction and ancestor instructions that have not yet been emitted.

30. A computer programmed as a high level shader language compiler having shader code optimizing transforms, comprising:
- a memory storing programming of the compiler;
- a processor for executing the programming;
- a tokenizer for lexically analyzing source text of the shader written in a high level shader language to produce a token representation of the shader;
- a parser for syntactically analyzing the token representation of the shader to produce a token tree representation of the shader;
- a compiler for generating an intermediate code representation of the shader; and
- a set of code optimizing transforms for modifying the intermediate code representation of the shader, the code optimizing transforms comprising at least one of a reorder transform, a phase pulling transform and a register assigning transform;
- the reorder transform operating to reorder instructions of the shader according to a heuristic measure prioritizing subsets of instructions that reduce active register load of the shader in an instruction sequence of the shader;
- the phase pulling transform operating to organize the shader's instructions into phases of texture load instructions and arithmetic instructions that tend to minimize the number of such phases;
- the register assigning transform operating to assign registers for instruction operands that tend to minimize register load of the shader.

* * * * *